United States Patent [19]

Kröbel et al.

[11] 4,383,329
[45] May 10, 1983

[54] APPARATUS FOR RECORDING DATA ON X-RAY FILMS OR THE LIKE

[75] Inventors: Heinz Kröbel, Taufkirchen; Roland Bruch, Munich; Rolf Eickel, Munich; Jürgen Müller, Munich; Heinrich Färber, Munich; Günther Bauer, Munich, all of Fed. Rep. of Germany

[73] Assignee: Agfa-Gevaert Aktiengesellschaft, Leverkusen, Fed. Rep. of Germany

[21] Appl. No.: 205,996

[22] Filed: Nov. 12, 1980

[30] Foreign Application Priority Data

Nov. 15, 1979 [DE] Fed. Rep. of Germany ....... 2946078

[51] Int. Cl.³ ............................................ H05G 1/28
[52] U.S. Cl. ................................... 378/166; 378/210
[58] Field of Search ......................... 250/476; 378/166

[56] References Cited

U.S. PATENT DOCUMENTS

| 3,263,647 | 8/1966 | Murphy | 250/476 |
| 3,953,738 | 4/1976 | Huttner | 250/476 |
| 4,250,389 | 2/1981 | Brendl | 250/476 |

Primary Examiner—Craig E. Church
Attorney, Agent, or Firm—Kontler, Grimes & Battersby

[57] ABSTRACT

Apparatus for recording data on X-ray films which are stored in cassettes having windows for exposure of certain portions of films therein includes a housing with two slots for insertion of cards with information pertaining to the patient and/or physician. The housing confines a battery of liquid crystals and an associated digital clock, digital calendar and digital counter each adapted to be actuated from the exterior of the housing to cause the corresponding liquid crystals to furnish the selected information. Such information, together with information on one of the cards, is imaged onto the exposed portion of X-ray film in the properly inserted cassette by a partly light transmitting mirror and an optical element. The images of the liquid crystals are inverted depending upon whether the X-ray film bears a postero-anterior or an antero-posterior picture of a patient's chest to thus ensure that the recorded data can be read while the physician looks at the developed film in a manner as is customary for examination of X-ray pictures. The liquid crystals can be illuminated by a discrete light source so that the light source which illuminates the data cards inserted into the housing need not be selected with a view to properly illuminate the liquid crystals and vice versa.

17 Claims, 2 Drawing Figures

APPARATUS FOR RECORDING DATA ON X-RAY FILMS OR THE LIKE

BACKGROUND OF THE INVENTION

The present invention relates to apparatus for recording data on X-ray film or like radiation-sensitive bodies, and more particularly to improvements in apparatus for projecting the images of data (e.g., the information pertaining to a patient, the information pertaining to the physician in charge, the date of the making of X-ray pictures of a patient, the exact time of the day of the making of such pictures, etc.) onto X-ray films or other radiation-sensitive bodies. Still more particularly, the invention relates to improvements in apparatus for projecting images of data onto X-ray films or other types of radiation-sensitive bodies which are or can be confined in cassettes or analogous receptacles.

German Pat. No. 2,021,494 discloses an apparatus which can be used to project images of data onto X-ray films while the films are confined in cassettes. Cassettes of the type adapted to be used in the apparatus of this German printed publication are provided with windows which can be sealed against entry of radiation. The apparatus of the German publication is equipped with means for opening the window of an inserted cassette and with means for imaging data onto that portion of the film which is exposed in response to opening of the window. The information which is imaged onto the film portion behind the window in a properly inserted cassette can include the date of making of the X-ray picture of the chest, mamma or another portion of the body of a patient. The aforementioned means for opening the window of a cassette (the window is provided in one of the major panels of the cassette) is capable of opening the window in spite of the fact that the window lock is designed to resist or interfere with opening of the window by unauthorized persons.

It is customary to inspect the X-ray picture of the chest of a patient in such a way that the heart is located at the right-hand side of the picture. In other words, a physician normally observes the picture of a chest in such a way as if the picture were taken from the front of the patient's body. However, many X-ray pictures of human chests are taken from the rear (i.e., they are so-called postero-anterior pictures in contrast to the so-called antero-posterior pictures). The imaging of patient data takes place prior to or after the making of pictures of the chest and serves to replace cumbersome manual application of patient data to X-ray films and/or cassettes for such films.

A physician further wishes to record the time of the day when an X-ray picture was taken. To this end, the apparatus of the aforementioned German Patent comprises a timer disc which is driven by a motor and is mounted adjacent to the data carrier card so that the image of the disc can be projected onto the film in a properly inserted cassette. A drawback of such proposal is that the information which is furnished by the disc is often highly inaccurate and also that the information cannot be readily deciphered by the physician, by the nurse or another person in charge of examining and evaluating X-ray pictures. Moreover, the space requirements of the just discussed disc and of the motor therefor are quite pronounced, i.e., they contribute significantly to the bulk of the entire apparatus so that the latter could not be further equipped with a calendar to record the date (day and month) of exposure of X-ray film and/or other data applying equipment.

OBJECTS AND SUMMARY OF THE INVENTION

An object of the invention is to provide an apparatus which can image patient data or analogous information onto X-ray films or like radiation-sensitive bodies in such orientation that the information is readily decipherable when the film is held in the customary position, irrespective of whether the film carries a postero-anterior or antero-posterior picture.

Another object of the invention is to provide an apparatus of the just outlined character which can accept data carriers in different positions but utilizes a single imaging system for any one of the properly inserted carriers.

A further object of the invention is to provide the apparatus with novel and improved means to image information which is not available on a card or an analogous sheet-like data carrier onto X-ray films or the like simultaneously with the data which are stored on a selected carrier.

An additional object of the invention is to provide a compact and simple apparatus which can accept conventional cassettes or analogous receptacles for X-ray film and which can be readily manipulated by a skilled technician as well as by a physician, a nurse, a nurse's aid or another semiskilled or unskilled person.

Another object of the invention is to provide an apparatus which can produce clear images of selected data on selected portions of X-ray films in such a manner as to ensure that the recorded information can be read by a person without the need to ascertain whether the X-ray film bears an antero-posterior or a postero-anterior picture.

The invention is embodied in an apparatus for applying to X-ray films or similar (preferably sheet-like) radiation-sensitive bodies data which are stored in part on cards or analogous carriers of information. The apparatus comprises a housing including means (e.g., a base formed with a socket) for supporting a body of radiation-sensitive material and at least one slot or analogous receiving means for a removable carrier of information so that a portion of a carrier which is properly inserted into the receiving means is exposed (i.e., observable and illuminable in the interior of the housing. The apparatus further includes a composite auxiliary carrier of information in the housing (such auxiliary carrier may comprise one or more rows or other arrays of liquid crystals), and means (including one or more light sources, one or more partly light-transmitting mirrors, prisms or pivotable mirrors, and one or more lenses or analogous optical elements) for imaging the aforementioned exposed portion of the carrier in the receiving means, as well as a selected part (e.g., a predetermined group of liquid crystals) of the auxiliary carrier, onto the body of radiation-sensitive material in the supporting means. The carrier which is inserted into the receiving means can be provided with information including the name of the patient, the age of the patient, the sex of the patient, the nature of treatment to which the patient is or must be subjected, the name of the physician in charge, and similar information. The information which is stored on or which can be furnished by the auxiliary carrier may include the time of the day, the day of the month, the month of the year and/or the serial number of the X-ray film (if the body of radiation-sensitive material in the supporting means is one of a short or long series of successive X-ray films of the chest or another portion of the body of a patient who is identified by data on the carrier in the receiving means of the housing).

The apparatus can be designed to apply data to X-ray films or similar radiation-sensitive bodies which are confined in cassettes or analogous receptacles of the type having a window to expose a portion of the radiation-sensitive body therein. The supporting means then includes means (e.g., the aforementioned base of the housing) for receiving (e.g., in a socket or recess of the base) a receptacle in such orientation that the exposed portion of the radiation-sensitive body in the receptacle faces toward the interior of the housing.

The apparatus preferably further comprises means (e.g., a control panel with knobs or the like at the exterior of the housing) for selecting those parts of the auxiliary carrier which are to be imaged onto the body of radiation-sensitive material in the supporting means.

The housing may comprise two receiving means (e.g., two slots disposed in planes which make an angle of 90 degrees) each of which can receive a discrete card or an analogous carrier of information. The auxiliary carrier is preferably adjacent to one of the receiving means and the imaging means includes means for imaging a selected part of the auxiliary carrier as well as the exposed portion of the carrier in either of the two receiving means. One of the receiving means is designed to receive a card or a like carrier when the X-ray film bears an antero-posterior picture of the chest of a patient, and the other receiving means is designed to receive a card or the like when the X-ray film bears a postero-anterior picture of the chest. The apparatus then further comprises means for inverting the image of the selected part of the auxiliary carrier when a card is inserted into a particular receiving means of the housing. This ensures that the information which is furnished by the auxiliary carrier can be read in the same way as the information which is furnished by card in the such receiving means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
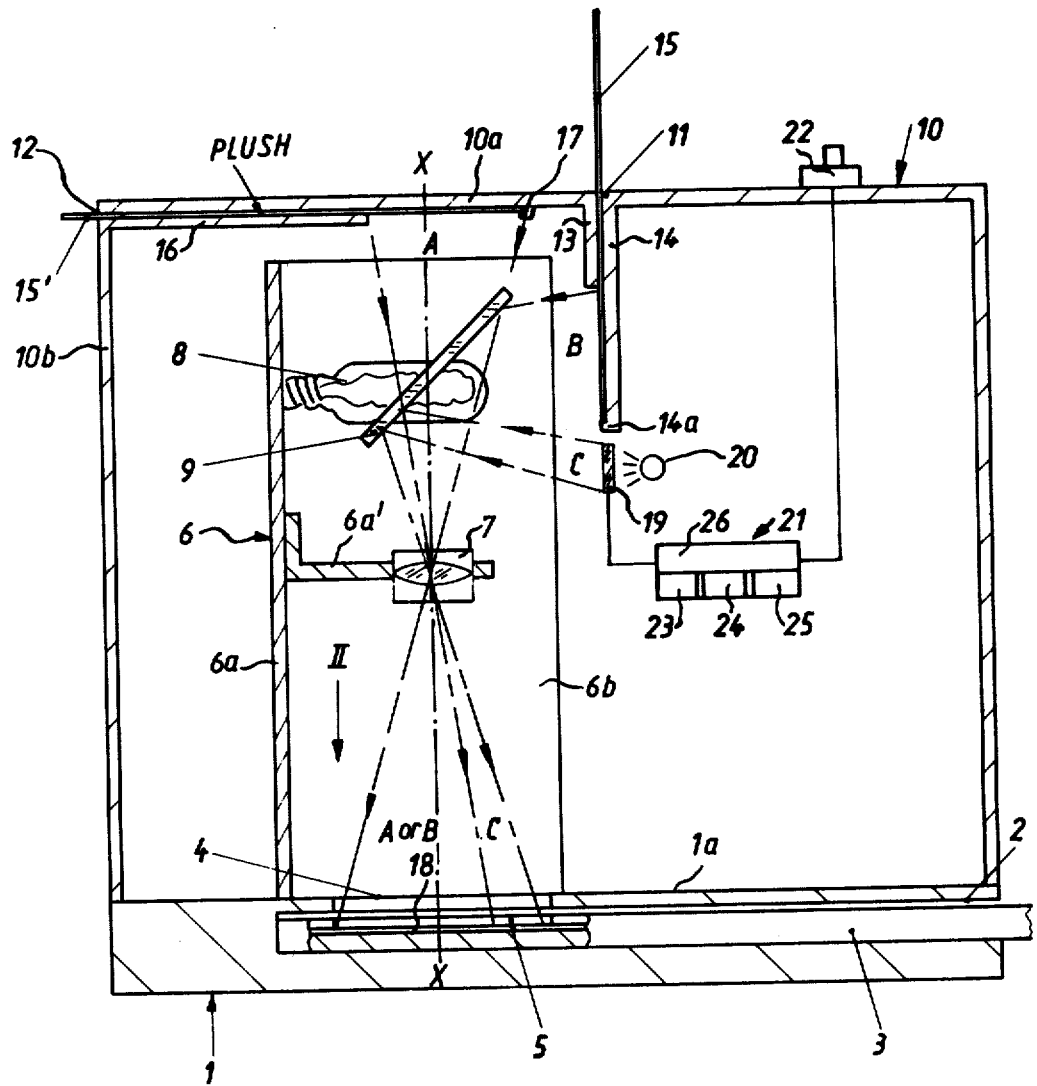
FIG. 1 is a schematic partly vertical sectional view of an apparatus which embodies the invention.

The apparatus of FIG. 1 comprises a base or supporting means 1 which is formed with a pocket or socket 2 for a cassette or an analogous receptacle 3 containing a body of radiation-sensitive material, e.g., a sheet 18 of X-ray film. The plate-like upper portion 1a of the base 1 (above the socket 2) is formed with a window or opening 4 in register with the window or opening 5 of a properly inserted cassette 3. The window 4 in the upper portion 1a of the base 1 is partially surrounded by an upstanding U-shaped holder 6 having three upright walls of which only the walls 6a and 6b can be seen in FIG. 1. The third wall is located in front of the plane of FIG. 1 and is or may be parallel to the wall 6b. The holder 6 supports a focusing lens 7 which is installed in a bracket 6a' secured to the inner side of the wall 6a. Furthermore, the holder 6 supports at least one light source 8 and a partially light-transmitting mirror 9 whose plane makes an angle of 45 degrees with the optical axis X—X of the lens 7.

The holder 6 rests on or is secured to the upper portion 1a of the base 1, and the latter forms part of a housing 10 having a horizontal top wall 10a which is remote from and parallel to the portion 1a. The housing 10 is formed with two receiving means in the form of slots 11 and 12 the first of which is vertical or nearly vertical and extends at right angles to the plane of the top wall 10a. The slot 12 is horizontal or nearly horizontal and is provided in the side wall 10b of the housing 10 so that it is immediately or closely adjacent to the underside of the top wall 10a. The slot 11 is bounded by two slightly spaced parallel guide walls 13 and 14 the latter of which is longer so that a portion B of a data carrier card 15 which is inserted into the vertical slot 11 is exposed and faces the mirror 9. The lower end portion of the guide wall 14 is provided with a projection 14a which constitutes a stop for the lower edge portion or leader of a properly inserted data carrier card 15. The data on the portion B of the card 15 can be imaged onto that portion of X-ray film 18 in the cassette 3 which is exposed to light below via the windows 4 and 5. The forward (downward) movement of the data carrier card 15 is arrested automatically when its leader strikes the stop 14a; at such time, a selected portion (namely, the portion B) of the properly inserted card 15 remains exposed because the guide wall 13 is shorter than the guide wall 14.

The top wall 10a of the housing 10 constitutes the upper guide wall for a data carrier card 15' which is inserted into the slot 12. The side wall 10b of the housing 10 is formed with or supports a further guide wall 16 which is relatively short so as to allow a portion (A) of the card 15' to face downwardly toward the base 1 when the card 15' is fully inserted in the slot 12 so that its leader abuts against a projection or stop 17 at the underside of the median portion of the top wall 10a. The exposed portion A of the card 15' faces one side of the mirror 9, and the exposed portion B of the card 15 faces the other side of the mirror.

If desired, those sides of the guide walls 13, 14 and 10a, 16 which face the respective cards 15, 15' in the receiving means or slots 11, 12 can be coated with plush (denoted by a legend applied to the upper side of the guide wall 16) to reduce the likelihood of penetration of outside light into the interior of the housing 10 when the card 15 or 15' is withdrawn from the respective slot.

The plane of the exposed portion A of the card 15' in the slot 12 is normal to the optical axis X—X of the lens 7, i.e., such plane makes an angle of approximately 45 degrees with the plane of the partially light-reflecting mirror 9. The light source 8 is located at one side of the optical axis X—X of the lens 7 so that it can simultaneously illuminate the portions A and B of the cards 15' and 15. Radiation which is reflected by the portion A of the card 15' penetrates through the mirror 9 and is focused by the lens 7 on the exposed portion of X-ray film 18 below the windows 4 and 5. The portion B of the card 15 reflects light substantially at right angles to the optical axis X—X of the lens 7; such light is reflected by the mirror 9 and is focused by the lens 7 on the exposed portion of the X-ray film 18 below the windows 4 and 5. The plane of the portion A is normal to the plane of the portion B. The image of the portion A is inverted once prior to impingement upon the film 18 in the cassette 3.

The portions A and B of the respective data carrier cards 15' and 15 bear information including the name of a patient, the age, sex, address, marital status, nature of illness, nature of treatment and/or other information pertaining to the patient, the name of the physician in charge, the name of the hospital or sanatorium and/or other statistics.

The guide wall 14 is disposed above a composite strip-shaped auxiliary carrier 19 of information which is located in front of a discrete second light source 20. For example, the auxiliary carrier 19 can consist of a row of twelve liquid crystals which are disposed next to or above each other. All of the liquid crystals are or can be exposed to and can transmit light issuing from the source 20. It will be noted that the auxiliary carrier 19 is disposed between the light source 20 and the mirror 9; the light source 20 is preferably elongated and extends in substantial parallelism with the auxiliary carrier 19 so that it can properly illuminate all of the liquid crystals. The crystals of the auxiliary carrier 19 are preferably coplanar or substantially coplanar with the portion B of a properly inserted data carrier card 15 in the receiving means or slot 11. The reference character C denotes the image of the auxiliary carrier 19 which is obtained when the light source 20 is on. Such image is reflected by a marginal portion of the mirror 9 (i.e., by a portion which does not reflect the image of the portion B and which is not traversed by light reflected by the portion A) to be projected onto the X-ray film 18 adjacent to the image of the portion A or B.

The auxiliary carrier 19 is associated with a control unit 21 which is actuated from a control panel 22. The latter is accessible from the exterior of the housing 10; in the embodiment of FIG. 1, the manually depressible or otherwise movable data selecting keys, knobs or like elements (not shown) of the control panel 22 are mounted on top of the wall 10a. The control unit 21 can actuate an electronically operated digital clock 23, an electronic digital date indicator (hereinafter called calendar) 24, and a suitable digital counter 25 which can cause the auxiliary carrier 19 to furnish the images of letters, numerals or encoded indicia. The devices 23-25 can be said to form part of the auxiliary carrier 19. The indicia which are or which can be furnished in response to actuation of the part 25 of the control unit 21 can identify certain specific or special features of the picture on the film 18. The control unit 21 comprises an inverting or reversing stage 26 which inverts the reflected wrong-side image C depending upon whether the X-ray rilm 18 bears a postero-anterior or an antero-posterior picture of a human chest. It is assumed here that the reproduction or picture on the film 18 is turned through 90 degrees and is adjacent to the image of relevant patient data (this will be readily appreciated by referring to FIGS. 2a-2d).

The light source 20 may be made up of discrete components and the auxiliary carrier 19 may include a large number of liquid crystals or diapositives each of which is located in front of a discrete component of the light source 20. The selector knobs of the panel 22 can cause the control unit 21 to illuminate selected components or sections of the light source 20 so that the selected components illuminate the associated liquid crystals or diapositives for imaging of data (furnished by 23, 24 and/or 25) on such crystals or diapositives onto that portion of the X-ray film which is located below the windows 4 and 5.

Alternatively, the auxiliary carrier 19 may further comprise a row of shutters behind the liquid crystals and a continuous light source 20 behind the shutters. Actuation of the control unit 21 via selector knobs on the control panel 22 will open selected shutters and will ensure that the liquid crystals which are exposed to light issuing from the source 20 furnish the desired information (determined by the clock 23, calendar 24 and/or counter 25) for imaging on that portion of the X-ray film 18 which is disposed below the windows 4 and 5.

Figure 2:
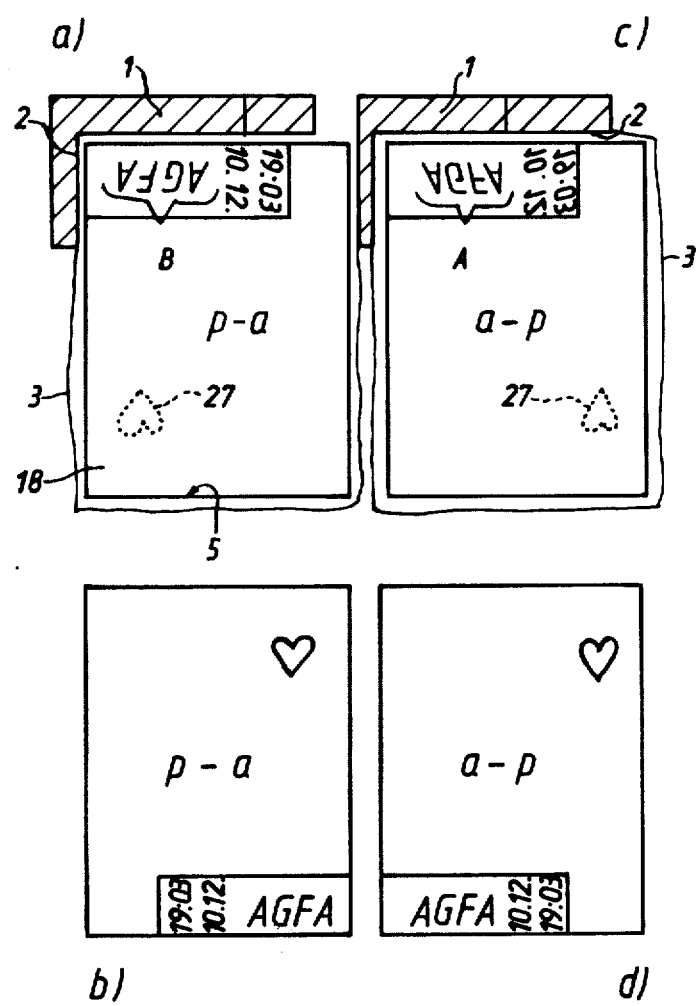
FIG. 2a is a fragmentary plan view as seen in the direction of arrow II in FIG. 1, showing the imaging of data onto an X-ray film which bears a postero-anterior picture of a human chest.
FIG. 2b shows a portion of the cassette of FIG. 2a subsequent to development of the X-ray film.
FIG. 2c is a view similar to that of FIG. 2a but showing the imaging of data onto an X-ray film which bears an antero-posterior picture.
FIG. 2d shows a portion of the cassette of FIG. 2c subsequent to development of the X-ray film.

FIGS. 2a to 2d illustrate two modes of imaging patient data next to the picture on the X-ray film 18. FIG. 2a shows a cassette 3 and a portion of the base 1 with the socket 2. The cassette 3 is assumed to be fully inserted in the socket 2 so that its window 5 registers with the window 4 (not shown in FIG. 2a) of the portion 1a of the base 1. For the sake of simplicity, patient data are shown as being imaged directly onto the cassette 3. By observing the upside-down picture 27 of the heart of a patient on the film 18, while looking at the film in the direction of propagation of radiation entering via windows 4 and 5, one will realize that the film 18 carries a postero-anterior picture, i.e., the patient was exposed to X-rays which penetrated from the back toward the front side of the chest. The underside of the cassette 3 faces upwardly and the patient data carrier card 15 is inserted into the slot 11 so that the lens 7 images the portion B of the card 15 onto the film 18 in the socket 2. In other words, the image of the portion B is reflected by the mirror 9 and is thereupon focused by the lens 7. The desired data on the auxiliary carrier 19 are imaged onto the film 18 adjacent to the image of the portion B, and such data are disposed in vertical rows. When the film 18 is developed, the observer sees the X-ray picture and the data in a manner as shown in FIG. 2b, it being assumed that the observer always looks at the film in such a way as if the patient were seen from the front. It will be seen that the data include the date (December 12) and the time of the day (19:03 PM) when the exposures of the card 15 and of selected portions of the carrier 19 (selected by the operator via control panel 22 and control unit 21) were made.

FIG. 2c shows an antero-posterior exposure, i.e., the patient was positioned with reference to the X-ray equipment in such a way that the X-rays penetrated his or her chest from the front side. The data which are imaged onto such film are stored on the carrier card 15' in the receiving means or slot 12 of the housing 10. Light issuing from the source 8 is reflected by the portion A of the properly inserted card 15' and penetrates through the mirror 9 to be focused by the lens 7. The portion A is imaged onto the film 18 in the cassette 3 in such a manner that it is not readable when projected onto the film 18. On the other hand, those data which are selected by the operator who manipulates the knobs of the control panel 22 for the unit 21 are inverted twice, first by the mirror 9 and thereupon by the lens 7 so that they are readable when projected onto the film in the cassette shown in FIG. 2c. In order to ensure that such data can be properly read when the physician observes the developed film (see FIG. 2d), the operator actuates the inverting device 26 of the control unit 21. The difference between the films of FIGS. 2b and 2d is that the patient data furnished by the auxiliary carrier 19 appear in different corner portions of the respective films.

An important advantage of the auxiliary carrier 19 and the associated discrete light source 20 is that the carrier 19 can be activated or deactivated at the will of the technician. This is in contrast to the aforementioned disc which is disclosed in the German Patent No. 2,021,494 and which must be driven by a discrete motor; the disc is illuminated by the projection lamp (i.e., by a lamp corresponding to the lamp 8 shown in FIG. 1) so that the image of the disc must appear on the X-ray film whenever the technician decides to expose patient data. On the other hand, it is often desirable to omit information pertaining to the time of the day when the exposure was made, to the day of the month, to the month of the year and/or other information which is optional.

Another important advantage of the improved apparatus is its surprising versatility. For example, the auxiliary carrier 19 and its light source 20 can image the time which is derived from a stop watch rather than the exact time of the day when the X-ray picture was made. This might be of interest when one makes a series of X-ray pictures which are taken at predetermined intervals (denoted by the recorded data) to ascertain the disappearance or fading of a contrast medium in the body of the patient. Furthermore, the device 25 can be used to identify successive pictures by numerals and/or letters or by encoded information. Analogously, the information which is furnished by the device 25 can denote certain other criteria of the X-ray pictures, e.g., certain circumstances under which the pictures were made, etc.

A further important advantage of the improved apparatus is that it can furnish, in digital form, data pertaining to the time of the day, to the day of the month, to the month of the year, to the order of a series of pictures, and/or other information. Furthermore, the technician in charge of the apparatus can accurately image the exact time of the day because he or she can adjust the control unit 21 from the accessible panel 22 so that the data pertaining to the second, minute, hour, day or month can be selected by the technician rather than by a motor which consumes energy and whose operation is or may be unreliable. The attendant can read the time off his or her watch or off an electric clock in the area where the apparatus is installed to thus ensure that the recorded time is accurate, and in particular, much more accurate than the times which are furnished by the motor-driven discs of conventional apparatus. This saves time because there is no need to adjust the clock from time to time since the technician observes a watch or clock and records the exact time whenever the need arises, i.e., whenever the technician decides to actuate the knobs of the control panel 22.

The advantages of a separate light source (20) for the auxiliary carrier 19 have been pointed out above. Thus, the imaging of data furnished by the auxiliary carrier 19 is independent of the imaging of data on the card 15 or 15'. Moreover, the intensity and/or other characteristics of the discrete light source 20 for the auxiliary carrier 19 can be selected independently of the corresponding characteristics of the projection lamp 8 so that the liquid crystals of the auxiliary carrier 19 can be imaged with a high degree of sharpness. It has been found that light which is furnished by light-emitting diodes is too weak for imaging of data on an X-ray film, i.e., the intensity of light which is furnished by such diodes is too low. If the exposure time for the information which is to be furnished by the card 15 or 15' were as long as the period of light emission by a light-emitting diode, the data selected from the control panel 22 would be properly exposed while the image of the portion A or B would be overexposed. Thus, the period of exposure of the portion A or B would have to be shorter than the period of exposure of the selected liquid crystal or crystals. This would unduly prolong the imaging of data onto X-ray films.

The cassette 3 may be of the type disclosed in the commonly owned copending application Ser. No. 949,138 filed Oct. 6, 1978 by Manfred Schmidt et al., now U.S. Pat. No. 4,259,586 granted Mar. 31, 1981.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for recording data on radiation-sensitive articles, particularly x-ray film, comprising:
   (a) a housing having a supporting element for radiation-sensitive articles, and a pair of receiving elements for primary data carriers having primary data to be recorded on the radiation-sensitive articles, said receiving elements being arranged to support the primary carriers such that the primary data on the same is exposed in the interior of said housing;
   (b) an auxiliary data carrier in said housing for auxiliary data to be recorded on the radiation-sensitive articles;
   (c) imaging means in said housing for imaging the primary and auxiliary data onto the radiation-sensitive articles, said auxiliary carrier and one of said receiving elements being arranged such that the images of the respective auxiliary and primary data have a first orientation at said supporting element, and the other of said receiving elements being arranged such that the images of the respective primary data have a second orientation at said supporting element which is inverted relative to said first orientation; and
   (d) control means for said auxiliary carrier, said control means including an inverting mechanism for the auxiliary data so as to permit the image of the same at said supporting element to assume said second orientation.

2. The apparatus of claim 1, wherein said imaging means comprises a first source for illuminating the primary data and a different second source for illuminating the auxiliary data.

3. The apparatus of claim 1, wherein said auxiliary carrier includes a plurality of liquid crystals.

4. The apparatus of claim 1, said auxiliary carrier including a digital clock; and wherein said control means comprises a setting device for said clock externally of said housing.

5. The apparatus of claim 1, said auxiliary carrier including a digital calendar; and wherein said control means comprises a setting device for said calendar externally of said housing.

6. The apparatus of claim 1, said auxiliary carrier including a counter; and wherein said control means comprises a setting device for said counter externally of said housing.

7. The apparatus of claim 1, wherein said control means is arranged to be activated from externally of said housing.

8. The apparatus of claim 1, wherein said imaging means comprises a light source for illuminating the primary data, and a partially light-transmitting mirror arranged to transmit light arriving from the direction of one of said receiving elements and to reflect light arriving from the direction of the other of said receiving elements.

9. The apparatus of claim 1, said supporting element being arranged to receive receptacles for the confinement of radiation-sensitive articles; and wherein said housing is provided with an opening to expose the receptacles to the interior thereof.

10. The apparatus of claim 1, said auxiliary carrier including a plurality of units for indicating different auxiliary data; and wherein said control means is arranged to activate said units individually.

11. The apparatus of claim 1, wherein said imaging means comprises a light source for illuminating the primary data, a lens for focusing the images of the primary data, and a pivotable mirror for directing the images of the primary data towards said lens.

12. The apparatus of claim 1, wherein said receiving elements comprise slots disposed in approximately perpendicular planes.

13. The apparatus of claim 1, said auxiliary carrier including a plurality of liquid crystals; and wherein said imaging means comprises a source for illuminating said crystals and said control means is arranged to permit selective illumination of said crystals.

14. The apparatus of claim 1, said auxiliary carrier including a plurality of liquid crystals; and wherein said control means is arranged to permit selective imaging of said crystals.

15. The apparatus of claim 1, wherein said auxiliary carrier is electronically operated.

16. The apparatus of claim 1, wherein said auxiliary carrier is adjacent to a selected receiving element of said pair.

17. The apparatus of claim 16, wherein said selected receiving element is said one receiving element.

* * * * *